United States Patent
Aramatsu

(10) Patent No.: US 7,358,570 B2
(45) Date of Patent: Apr. 15, 2008

(54) LIQUID CRYSTAL DISPLAY PANEL

(75) Inventor: Yoshiaki Aramatsu, Tottori (JP)

(73) Assignee: Epson Imaging Devices Corp., Nagano (JP)

( * ) Notice: Subject to any disclaimer, the term of this patent is extended or adjusted under 35 U.S.C. 154(b) by 112 days.

(21) Appl. No.: 11/340,519

(22) Filed: Jan. 27, 2006

(65) Prior Publication Data

US 2006/0175713 A1 Aug. 10, 2006

(30) Foreign Application Priority Data

Feb. 4, 2005 (JP) ............................. 2005-028546

(51) Int. Cl.
*H01L 23/48* (2006.01)

(52) U.S. Cl. ...................... 257/347; 257/786; 349/149; 349/150; 349/151; 349/152; 345/204; 345/205; 345/206

(58) Field of Classification Search ................ 257/786, 257/347; 349/149, 151, 152; 345/204–206
See application file for complete search history.

(56) References Cited

U.S. PATENT DOCUMENTS

| | | | | |
|---|---|---|---|---|
| 5,657,139 A | * | 8/1997 | Hayashi | 349/40 |
| 6,147,739 A | * | 11/2000 | Shibatani | 349/152 |
| 6,603,527 B1 | | 8/2003 | Hayata et al. | |
| 2004/0201787 A1 | * | 10/2004 | Sekiguchi et al. | 349/16 |
| 2006/0175713 A1 | * | 8/2006 | Aramatsu | 257/786 |

FOREIGN PATENT DOCUMENTS

| | | |
|---|---|---|
| JP | 05-142553 | 6/1993 |
| JP | 05-264987 | 10/1993 |
| JP | 11-202353 | 7/1999 |
| JP | 2000-137239 | 5/2000 |

OTHER PUBLICATIONS

European Search Report dated Jun. 6, 2006, issued is corresponding European Application No. 06002129.2.

* cited by examiner

*Primary Examiner*—Wai-Sing Louie
*Assistant Examiner*—Marc Armand
(74) *Attorney, Agent, or Firm*—Westerman, Hattori, Daniels & Adrian, LLP.

(57) ABSTRACT

A COG type liquid crystal display panel 10 in which a rectangular chip mounting area MA for mounting an IC chip 14 is provided on one of a pair of substrates 11, 12 on which a plurality of electrodes are provided, a plurality of extraction electrodes 20 that are severally connected to the electrodes are lead out into the chip mounting area, and the terminals for bump $21u$ to $21z$, $31u$ to $31z$ connected to bump terminals of the IC chip are formed on the extraction electrodes, from which the extraction electrodes are lead out at least on two sides of the rectangular chip mounting area and further extended into the chip mounting area from the terminals for bump and terminals for inspection $22u$ to $22z$, $32u$ to $32z$ are arrayed on extended end portions of the extraction electrodes so as to be drawn up in a line according to a predetermined rule of the electrodes to which the extraction electrodes are connected. Consequently, it is possible to provide a liquid crystal display panel upon which intermediate functional inspection can be easily performed even if it is a COG type liquid crystal display panel on which a fairly large number of extraction electrodes exist.

6 Claims, 9 Drawing Sheets

LIQUID CRYSTAL DISPLAY PANEL

BACKGROUND OF THE INVENTION

1. Field of the Invention

The present invention relates to a COG (Chip On Glass) type liquid crystal display panel, particularly to a liquid crystal display panel upon which intermediate functional inspection can be conducted before mounting an IC (Integrated Circuit) chip for driving liquid crystal.

2. Background Art

The COG type liquid crystal display panel is so constructed that the chip mounting area for mounting the IC chip to drive the liquid crystal is provided on one of a pair of substrates on which a plurality of electrodes are formed in a matrix state, whose peripheral areas are bonded together by a sealing material, between which liquid crystal is filled, a plurality of extraction electrodes severally connected to the electrodes are lead out to the mounting area, and terminals for bump, which are connected to bump terminals of the IC chip that drives the liquid crystal, are formed on these lead out extraction electrodes.

Subsequently, before mounting the IC chip for driving liquid crystal on the substrate, an intermediate functional inspection is performed for such faults as the presence of broken electrodes, short circuit between electrodes and whether or not the display performs as designed when a predetermined voltage is applied to the electrodes. The inspection method is performed by allowing contact pins to contact the tip portions of the plurality of electrodes and applying voltage to each electrode through the contact pins.

Such inspection method can be executed without a problem when gaps between the plurality of electrodes are wide. However, liquid crystal display panels of cell phones or the like have become higher definition and gaps between electrodes have accordingly become narrower, and on the other hand, circuit design is such that a large number of extraction electrodes concentrate on the chip mounting area. Therefore, allowing the contact pins to contact each electrode has become a very difficult task.

As a method of getting round this difficult task, an inspection is performed in which predetermined terminals of the plurality of terminals for bump are selected, that is, every other terminal for bump is selected for example, and the contact pins are allowed to contact them.

However, this method also requires high accuracy in aligning the contact pins. In addition, its work efficiency is poor, working time increases proportionally with an increased number of terminals for bump and IC chips, and thus inspection errors easily occur. Further, there is a danger that the terminals for bump will be damaged because the contact pins are allowed to contact the terminals for bump.

In fact, to solve such inconvenience, a liquid crystal display panel is known in which, in addition to the terminals for bump, terminals for inspection are provided to make substrate inspection before mounting the chip for driving the liquid crystal easier (See Japanese Patent Laid-Open No. 2000-137239 Publication (FIG. 3, paragraphs [0017] to [0022]), for example).

FIG. 8 is an enlarged plan view of a principal portion of the liquid crystal display panel described in the above Japanese Patent Laid-Open No. 2000-137239.

The liquid crystal display panel 80 includes a front glass substrate 81 and a rear glass substrate 82 with a slightly larger area than the substrate 81, and it has a construction such that liquid crystal is filled in the area formed by the facing substrates 81, 82 via a peripheral sealing material 83 to form a display region, a chip mounting area MA on which the IC chip for driving liquid crystal (not shown) is mounted is provided on a projected portion of the rear glass substrate 82, and the end portion of each extraction electrode 84 is extended into the chip mounting area MA.

In each extraction electrode (84a to 84i), an area with a predetermined length in the chip mounting area MA is used as a bump connection area A for connection to the bumps of an IC chip. In each bump connection area A of each extraction electrode 84a to 84i, an extended area B extending in the opposite direction to the peripheral sealing material 83, that is, extending further into the chip mounting area MA is provided repeatedly, and a square-shaped broadened land R, which is wider than the width of the bump connection area A is severally formed on the terminal portion of each extended area B.

Each extended area B has a different length, with the extended areas B of odd numbered extraction electrodes 84a, 84c, 84e, 84g, and 84i being short, and the extended areas B of even numbered extraction electrodes 84b, 84d, 84f, and 84h having a length exceeding the odd numbered broaden lands R.

Therefore, when the broadened land R is formed on the terminal portion of each extraction electrode 84a to 84i, in the case where inspection is performed by a pin probe method before mounting the IC chip 84, the contact pins are able to contact the broadened land R due to its width as shown in the black circles in FIG. 8, so that strict alignment accuracy is unnecessary and the inspection becomes easier in comparison to the conventional case in which the contact pins are allowed to contact the bump connection areas A.

However, in the above-described Japanese Patent Laid-Open No. 2000-137239, since each broaden land R must be made wider than the width of the bump connection area A, which is in a square shaped broadened land for example, they can not be housed in the chip mounting area when the number of lands is increased. Liquid crystal display panels in recent years have a large number of electrodes and they are arrayed in high density, so that a large number of such broadened lands cannot be arranged within the chip mounting area.

Furthermore, regarding the inspection method, because the contact pin must individually contact each land, the work efficiency of inspection is poor and the working time is increased. Additionally, if inspection is performed by allowing all of the contact pins to contact the terminals for bump, a very expensive inspection device will be necessary. Still further, when a simple inspection device using conductive rubber is used in the case where positions for arranging different types of terminals (for source electrodes, for gate electrodes, for common electrodes) are not divided, terminals that are not intended to be turned on are turned on if the different types of terminals are arranged adjacent to each other, and inspection cannot be performed properly.

Consequently, the present inventors have developed a liquid crystal display panel to solve the above-described problems, in which terminals for inspection are additionally extended from the terminals for bump into the chip mounting area, terminals for inspection, which are extended from one type of terminal for bump, out of the terminals are arranged in a row, and different types of terminals can be inspected simultaneously by using conductive rubber to improve workability, and have already applied for patent for this invention as Patent Application No. 2004-181474 (hereinafter, referred to as prior application).

FIG. 9 is an enlarged plan view showing the chip mounting area and the surrounding of the liquid crystal display panel of the prior application.

In the liquid crystal display panel of the prior application, extraction electrodes 120, which are connected to a plurality of electrodes arranged in a matrix state, are wired so as to concentrate in the chip mounting area MA, terminals for bump 121a to 121n are positioned in the chip mounting area MA, and terminals for inspection 122a to 122n are positioned so as to form a line by and alongside the terminals for R, G and B via the extraction electrodes from the terminals for bump 121a to 121n, as shown in FIG. 9.

An inspection probe (not shown) made of a belt-shaped conductive rubber is allowed to contact the terminals for inspection 122a to 122n that are positioned in this manner, and thus intermediate functional inspection can be achieved collectively according to the type of each terminal for bump 121a to 121n.

However, in the above-described prior art, inspection can be performed accurately and the number of inspections can be drastically reduced when terminals are provided on one side (a) out of four sides (a) to (d) of a rectangular chip mounting area MA, and there are panels which have a fairly large number of extraction electrodes 120 with the demand for higher definition from liquid crystal display panels in recent years. Regarding such panels, it is necessary for extraction electrodes to be drawn around to each side (three sides (a), (c), (d), for example) of the chip mounting area MA. In this case, since it is not only necessary to perform intermediate functional inspection of each of the terminals for inspection, which are positioned on each side, but also the terminals for inspection concentrated in the central area of the chip mounting area MA, there has been a danger that inspection could not be performed accurately when using the conductive rubber.

SUMMARY OF THE INVENTION

Consequently, in view of the above-described problems, the present inventors found out, after various study of methods capable of easily performing intermediate functional inspection even on a COG type liquid crystal display panel in which a quite large number of extraction electrodes exist, that the number of inspections can be reduced and the inspection itself can be performed easily if the arrangement of terminals for inspection is appropriately devised, and in this way have reached the present invention.

Specifically, it is an object of the present invention to provide a COG type liquid crystal display panel upon which intermediate functional inspection can be performed easily.

To achieve the above-described object, the liquid crystal display panel according to claim 1 is a COG (Chip On Glass) type liquid crystal display panel in which a substantially rectangular chip mounting area for mounting an IC chip for driving liquid crystal is provided on one of a pair of substrates on which a plurality of electrodes arranged in a matrix state are formed, liquid crystal is filled between the substrates whose peripheral areas are bonded together by a sealing material, a plurality of extraction electrodes severally connected to the electrodes are lead out of the chip mounting area, and terminals for bump, which are connected to bump terminals of the IC chip for driving liquid crystal, are formed on the lead out extraction electrodes, in which the plurality of extraction electrodes are lead out to at least two sides of the rectangular chip mounting area and are further extended onto the chip mounting area from the terminals for bump, and terminals for inspection are arrayed on extended end portions of the extraction electrodes such that electrodes, to which the extraction electrodes are connected, are drawn up in a line to a predetermined rule.

Further, the invention of claim 2 is in accordance with the liquid crystal display panel of claim 1, in which the extraction electrodes are connected to transparent electrodes which correspond to each R, G and B pixel via switching elements when required, the terminals for inspection are used as terminals for inspecting R, G and B that correspond to the connected transparent electrodes for R, G and B, and the terminals for inspection are arrayed based on the predetermined rule that the terminals are arrayed in a line by and alongside the terminals for inspecting R, G and B.

Further, the invention of claim 3 is according to the liquid crystal display panel of claim 1, in which the plurality of extraction electrodes are lead out on opposite long sides of the rectangular chip mounting area.

Further, the invention of claim 4 is in accordance with the liquid crystal display panel of claim 1, in which the plurality of extraction electrodes are lead out on three sides of the rectangular chip mounting area except for the one side that is most remote from the display surface of the liquid crystal display panel.

Further, the invention of claim 5 is in accordance with the liquid crystal display panel of claim 1, in which extraction electrodes connecting the terminals for bump and the terminals for inspection are wired so as not to overlap each other.

Further, the invention of claim 6 is in accordance with the liquid crystal display panel of claim 1, in which the width of the terminals for inspection is made smaller than that of the terminals for bump.

Further, the invention of claim 7 is in accordance with the liquid crystal display panel of claim 1, in which the terminals for bump are arrayed along the longer sides of the rectangular chip mounting area, and adjacent terminals for bump are arrayed on separate straight lines to prevent the adjacent terminals for bump from contacting each other.

BRIEF DESCRIPTION OF THE DRAWINGS

FIG. 1 shows a liquid crystal display panel according to Example 1 of the present invention, in which

DETAILED DESCRIPTION OF THE PREFERRED EMBODIMENTS

In the following, preferred embodiments of the present invention will be described with reference to the drawings. However, the embodiments shown below exemplify liquid crystal display panels for achieving the technical concept of the present invention, but they are not intended to specify the present invention to the panels as other embodiments included within the scope of the claims are equally applicable.

Figure 1A:
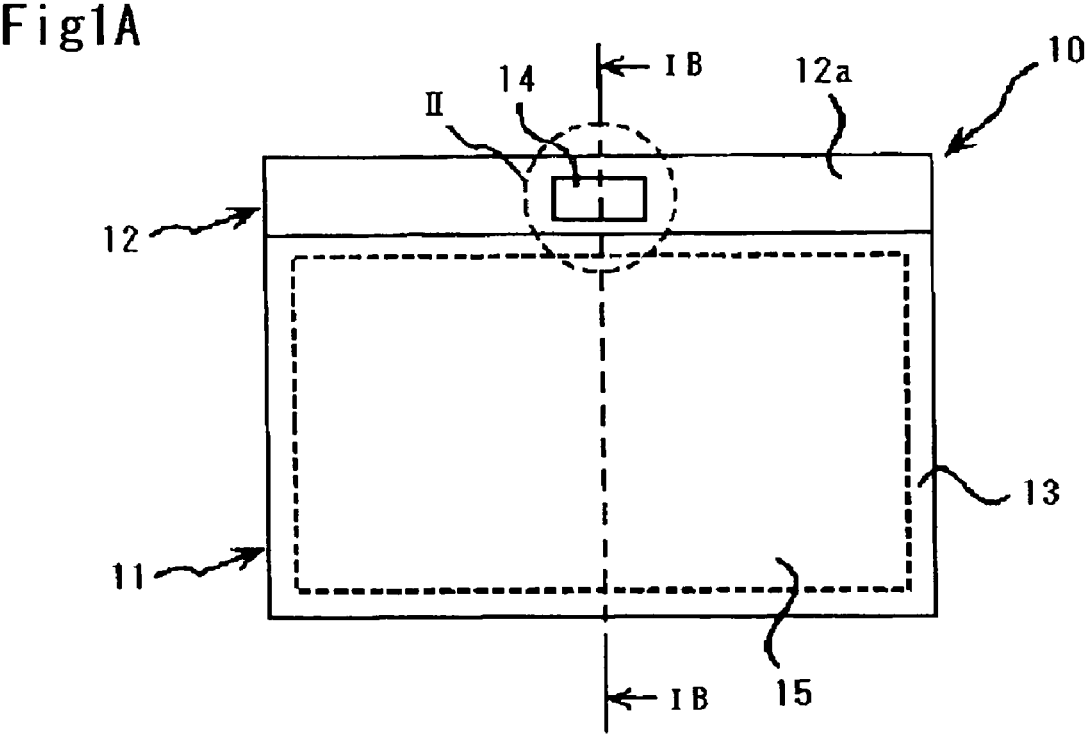
FIG. 1A is a plan view and FIG. 1B is a cross-sectional view taken along IB-IB of FIG. 1A.
Figure 1B:
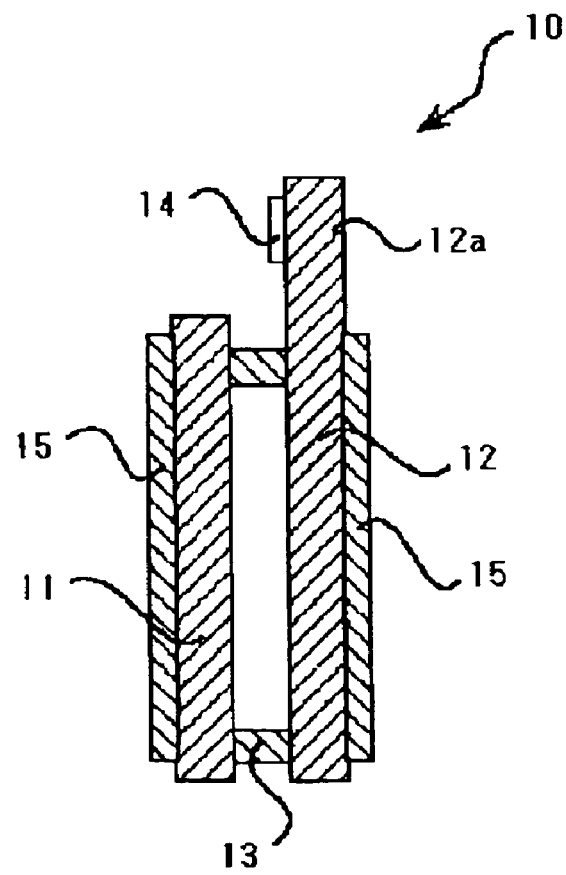
Figure 2:
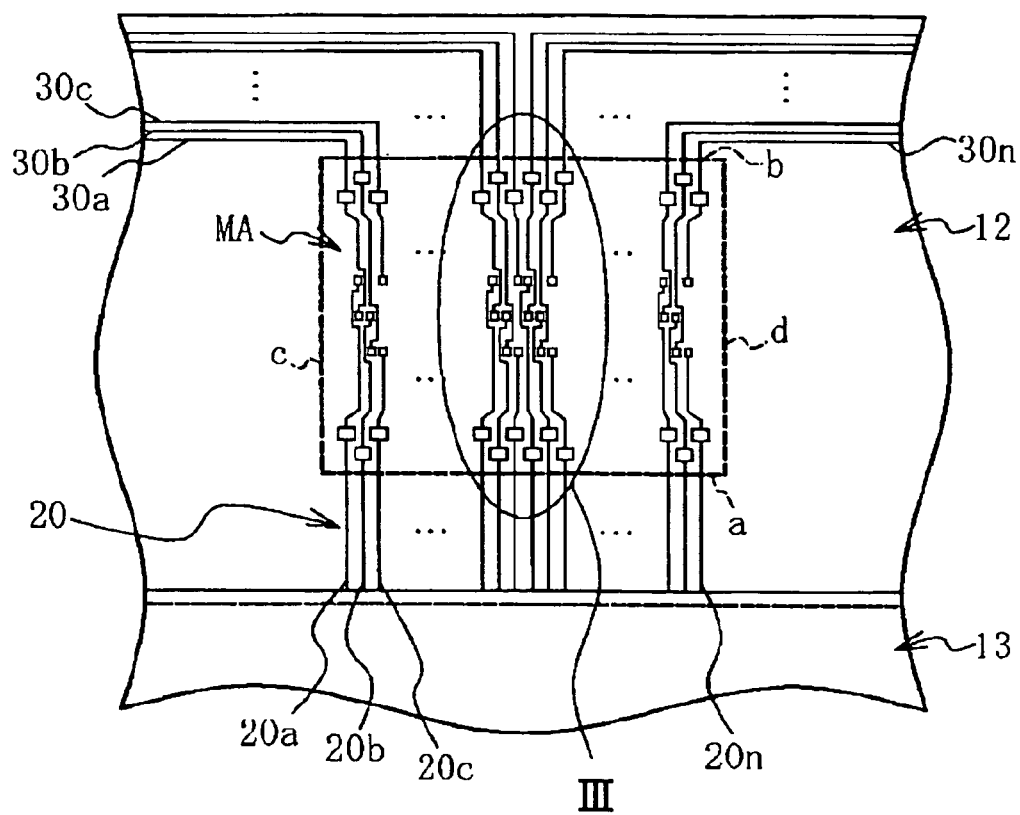
FIG. 2 is an enlarged plan view of a principal portion, which shows an enlarged II portion of FIG. 1 before an IC chip for driving liquid crystal has been mounted.
Figure 3:
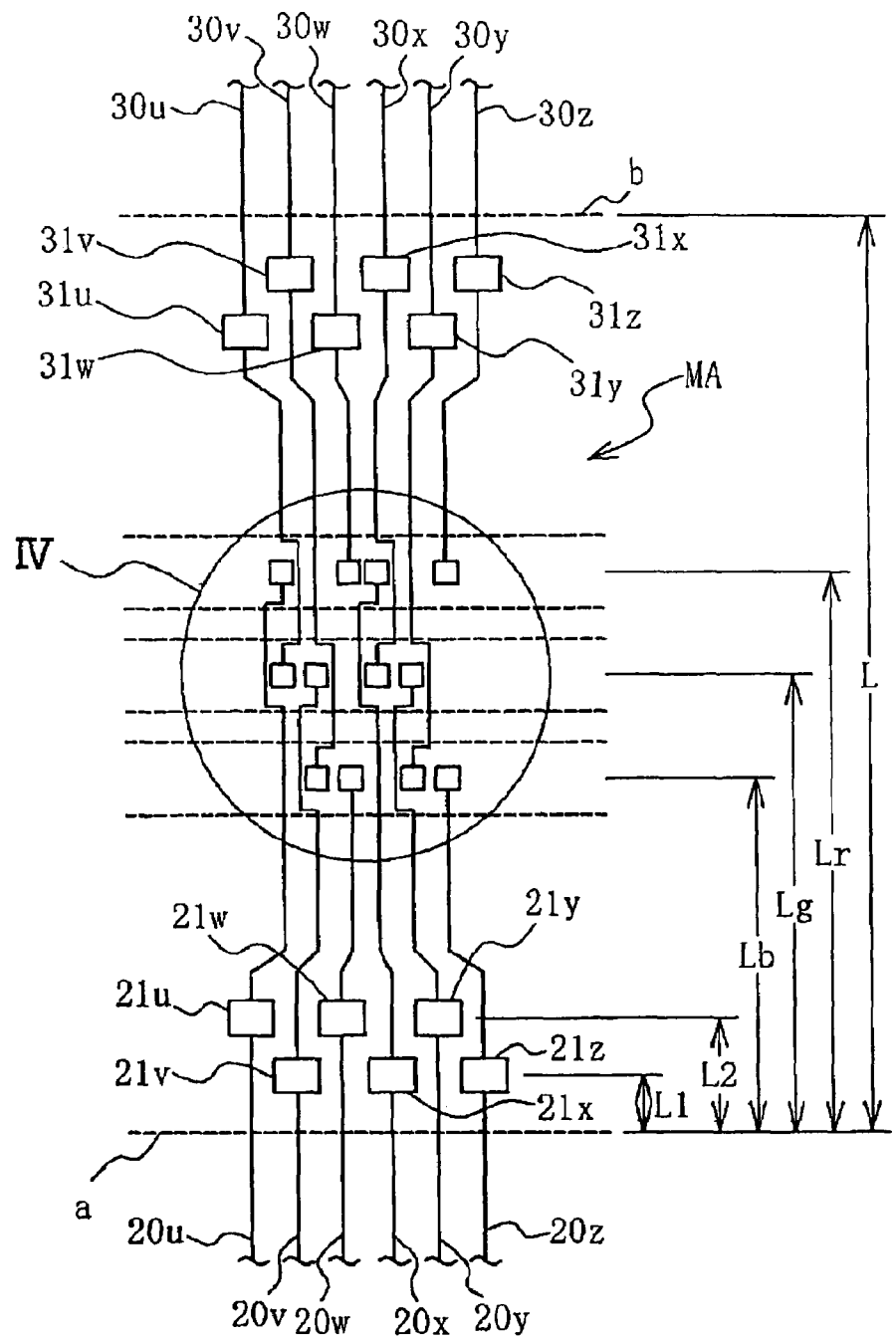
FIG. 3 is a principal portion enlarged view showing an enlarged III portion of FIG. 2.
Figure 4:
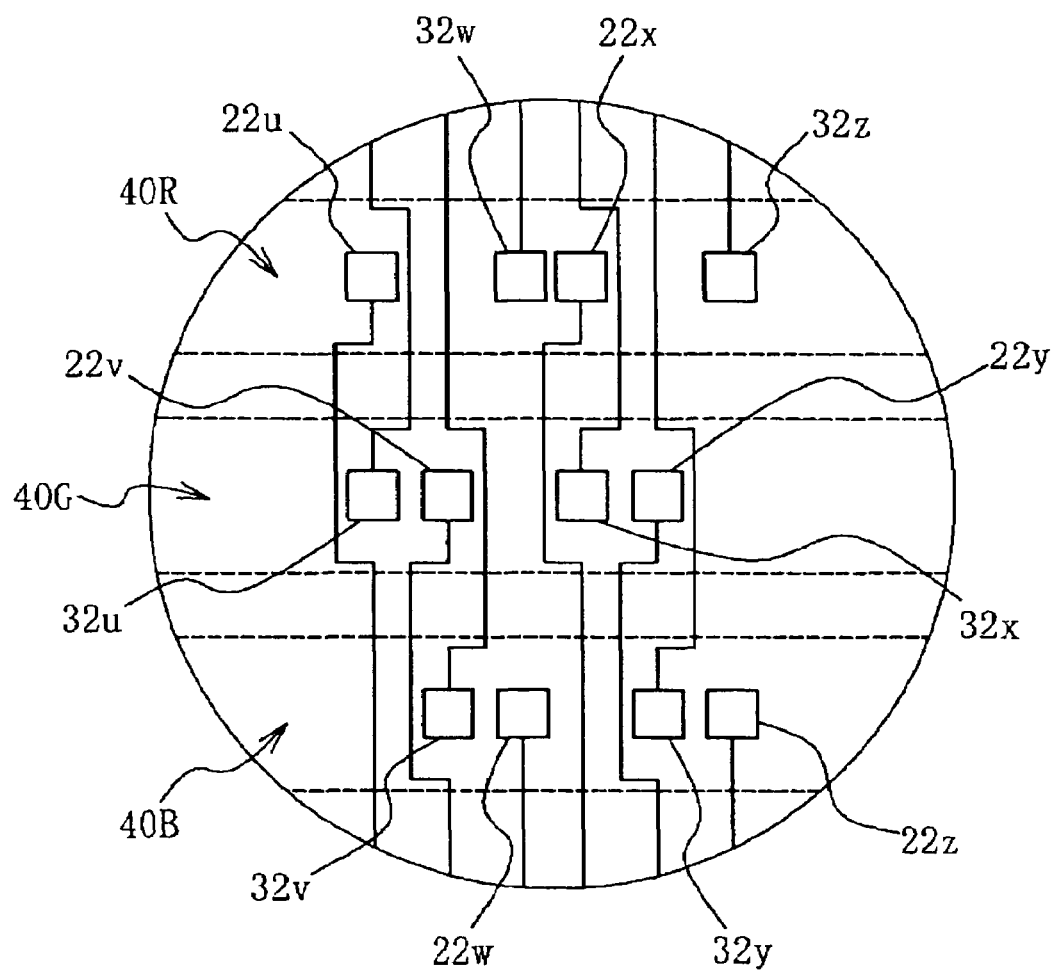
FIG. 4 is a principal portion enlarged view showing an enlarged IV portion of FIG. 3.
Figure 5:
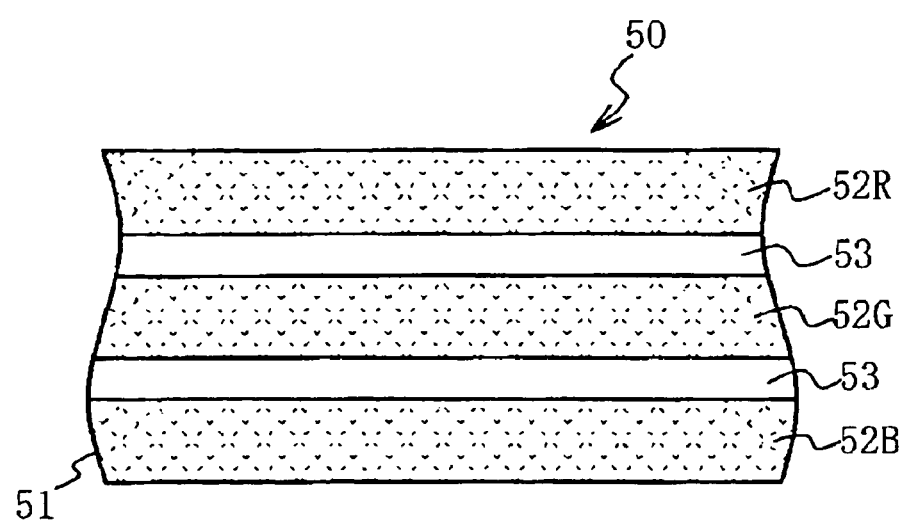
FIG. 5 is a view showing an example of an inspection probe used in intermediate functional inspection of the liquid crystal display panel.

FIG. 1 shows the liquid crystal display panel according to Example 1 of the present invention, in which FIG. 1A is the plan view and FIG. 1B is the cross-sectional view taken along IB-IB of FIG. 1A. FIG. 2 is the enlarged plan view of the principal portion, which shows the enlarged II portion of FIG. 1 before the IC chip for driving liquid crystal has been mounted. FIG. 3 is the principal portion enlarged view showing the enlarged III portion of FIG. 2. FIG. 4 is the principal portion enlarged view showing the enlarged IV portion of FIG. 3. FIG. 5 is a view showing an example of the inspection probe used in the intermediate functional inspection of the liquid crystal display panel.

The liquid display panel 10 includes a front glass substrate 11 and a rear glass substrate 12 with a slightly larger area than the glass substrate 11 as shown in FIG. 1. A plurality of transparent electrodes (not shown) made of ITO (Indium Tin Oxide) are formed on the facing surfaces of the substrates 11, 12. Subsequently, a plurality of electrodes arranged in a matrix state are arranged on the rear glass 12, and the electrodes are connected to the transparent pixel electrodes via switching elements such as TFT, LTPS, HTPS and MIM as required.

A pair of substrates 11, 12 are bonded together via a peripheral sealing material 13 so as to form a predetermined cell gap filled with liquid crystal between them, and a display region is formed by filling liquid crystal between both the substrates 11, 12. Further, a chip mounting area MA for mounting an IC chip for driving liquid crystal 14 is formed in the area 12a where the rear glass substrate 12 of the substrates is projected (hereinafter, referred to as substrate projected area), and the chip mounting area MA is formed as an approximately rectangular space that consists of long sides (a), (b) and short sides (c), (d), which are made to fit the shape of the IC chip.

Extraction electrodes 20 connected to the electrodes (refer to FIG. 2) are formed on the substrate projected area 12a by ITO in the same manner, and the extraction electrodes extend into the chip mounting area MA. Note that electrodes connected to the extraction electrodes 20 mentioned here are signal electrodes (source electrodes), and scanning electrodes (gate electrodes) and common electrodes are similarly connected to the extraction electrodes and voltage is applied to them, but explanation regarding their structure or the like will be omitted. Further, polarizer 15, 15 are severally adhered to the substrates 11, 12 as shown in FIG. 1A.

A plurality of extraction electrodes $20a$ to $20n$, $30a$ to $30n$ are wired on the chip mounting area MA so as to concentrate in the area MA as shown in FIG. 2. More specifically, the plurality of extraction electrodes $20a$ to $20n$, $30a$ to $30n$ are drawn out into the chip mounting area MA from the transparent electrode side while traveling under the peripheral sealing material 13, and the wiring of the extraction electrode in this example is done such that half of the extraction electrodes $20a$ to $20n$ drawn out of the electrodes are drawn around to one long side (a) of the rectangular chip mounting area MA and the remaining half $30a$ to $30n$ is drawn around toward the other long side (b). Furthermore, on the extraction electrodes $20a$ to $20n$, $30a$ to $30n$, terminals for bump $21a$ to $21n$, $31a$ to $31n$ that are connected to bump terminals of the IC chip 14 are formed at positions of a predetermined length after the electrodes entered the chip mounting area MA. Further, since the plurality of extraction electrodes are connected to R, G and B pixels, the terminals for bump $21a$ to $21n$, $31a$ to $31n$ are also used for R, G and B.

FIG. 3 is the principal portion enlarged view showing the enlarged III portion of FIG. 2, and the extraction electrodes and the terminals for bump shown here are shown as $20u$ to $20z$, $30u$ to $30z$, and $21u$ to $21z$, $31u$ to $31z$.

The terminals for bump $21a$ to $21n$, $31a$ to $31n$ connected to the R, G and B pixels via the extraction electrodes $20a$ to $20n$, $30a$ to $30n$ are formed at positions in the chip mounting area MA at a predetermined distance from each side. Further, terminals for bump in close proximity are provided as shown in FIG. 3 such that their distance from each side is different for each terminal, that is, odd numbered terminals for bump $21u$, $21w$, $21y$, ($31u$, $31w$, $31y$) are positioned by distance L1 from the side (a) (or (b)) in close proximity and even numbered terminals for bump $21v$, $21x$, $21z$, ($31v$, $31x$, $31z$) are positioned by distance L2 from the side (a) (or (b)) in close proximity, for example. At this point, L1<L2 holds, and by alternately placing the terminals for bump in close proximity in this manner, it is not necessary to make the gap between terminals for bump large and the terminals can be placed highly densely, and a larger number of terminals for bump can be positioned on each side (a) to (d) of the chip mounting area MA.

Furthermore, extraction electrodes are further lead out of said terminals for bump $21u$ to $21z$, $31u$ to $31z$, and terminals for inspection $22u$ to $22z$, $32u$ to $32z$ used in performing the intermediate functional inspection are positioned at the tip portions of the electrodes. The length of the terminals for inspection $22u$ to $22z$, $32u$ to $32z$ in a direction to the width direction, that is, at right angles to a so-called longitudinal direction of the extraction electrodes is made shorter than that for said terminals for bump $21u$ to $21z$, $31u$ to $31z$. This is because the terminals for bump $21u$ to $21z$, $31u$ to $31z$ are made relatively large in order to reliably connect to the terminals for bump that are made of protrusions provided for the IC chip 14, while the terminals for inspection $22u$ to $22z$, $32u$ to $32z$ can be made small since they may only contact the inspection probe 50 made of conductive rubber (described later). Thus, the terminals for inspection $22u$ to $22z$, $32u$ to $32z$ can be installed near the central area of the relatively narrow chip mounting area MA.

Subsequently, the arrangement of the terminals for inspection $22u$ to $22z$, $32u$ to $32z$ will be described referring to FIG. 3 and FIG. 4. Meanwhile, for easy understanding of the positional relationship between terminals for inspection, description will be made based on the assumption that the direction parallel with the short sides (c), (d) of the chip mounting area MA be the vertical direction, the direction parallel with the long sides (a), (b) be the horizontal direction, and the length of the chip mounting area MA in the vertical direction be L.

As described above, the terminals for bump $21a$ to $21n$, $31a$ to $31n$ are connected to the R, G and B pixels, and the terminals for bump $21u$, $21x$, $31w$, $31z$, the terminals for bump $21v$, $21y$, $31u$, $31x$, and the terminals for bump $21w$, $21z$, $31v$, $31y$ are respectively connected to the R (red) pixels, the G (green) pixels and the B (blue) pixels, in the terminals for bump $21u$ to $21z$, $31u$ to $31z$ shown in FIG. 3.

Of these terminals, the terminals for inspection $22u$, $22x$, $32w$, $32z$ lead out of the terminals for bump $21u$, $21x$, $31w$, 31z connected to the R pixels are arranged such that the terminals for inspection (22u, 22x) extending from one side (a) of the chip mounting area MA are arranged in a line in the horizontal direction at a position a distance Lr from one side (a) of the chip mounting area MA, and then the terminals for inspection 32w, 32z extending from the other side (b) of the chip mounting area MA are arranged in a line in the horizontal direction in the same manner at a position distance (L-Lr) from the other side (b) of the chip mounting area MA. Specifically, the terminals for inspection extending from the extraction electrodes that have been drawn around in different directions are arranged in a straight line in the horizontal direction. Such an arrangement is similarly performed on to the terminals for inspection extending from the extraction electrodes that are connected to the G pixels and the B pixels, in which the terminals for inspection 22v, 22y connected to the G pixels and the terminals for inspection 32u, 32×are arranged in a straight line in the horizontal direction at a position distance Lg from one side (a) and at a position distance (L-Lg) from the other side (b) respectively, and the terminals for inspection 21w, 21z connected to the B pixels and the terminals for inspection 31v, 31y are arranged in a straight line in the horizontal direction at a position a distance Lb from one side (a) and at a position a distance (L-Lb) from the other side (b) respectively. Meanwhile, the terminals for inspection 32u to 32z extending from the other side (b) out of the terminals for inspection 22u to 22z, 32u to 32z that are arranged in this manner are arranged so as to be positioned between the terminals for inspection of the same type, which are separately arranged according type of pixels to which the terminals for inspection 22u to 22z extending from the one side (a) are connected (such that the terminal for inspection 32w comes between the terminals for inspection 22u, 22×connected to the R pixels as shown in FIG. 4, for example) not to overlap the terminals for inspection 22u to 22z extending from the one side (a) when this arrangement is used.

As described above, the terminals for inspection 22u to 22z, 32u to 32z arranged separately by type of pixel connected, as shown in FIG. 4, are arranged so as to position in probe contact regions 40R, 40G, 40B to which belt-shaped conductive layers 52R, 52G, 52B corresponding to R, G and B of the inspection probe 50 made of the conductive rubber (described later), so that the intermediate functional inspection by conductive rubber can be performed without using the contact pin for inspection as the inspection probe in performing the intermediate functional inspection.

Further, the inspection probe 50, as shown in FIG. 5, is made of a plate-shaped body 51 with an approximately rectangular shape and predetermined thickness, that is, silicon rubber for example, in which the belt-shaped conductive layers 52R, 52G, 52B are formed by mixing conductive grains of predetermined widths in a longitudinal direction, and remaining portions are laid between the belt-shaped conductive layers 52R, 52G, 52B as belt-shaped insulating layers 53, 53. Furthermore, the belt-shaped conductive layers 52R, 52G, 52B severally correspond to the terminals for inspecting R, G and B 22u to 22z, 32u to 32z, and have a width wide enough to contact the terminals for inspection during inspection. The inspection probe 50 is connected to an inspection device (not shown).

Description will be made below of the intermediate functional inspection of the liquid crystal display panel by using the terminals for inspection arrayed as described above referring to FIG. 4.

First, as shown above, the inspection probe 50 is allowed to contact the terminals for inspection 22u to 22z, 32u to 32z, which are arrayed in three rows on the probe contact regions 40R, 40G, 40B corresponding to the R, G and B pixels to which connected electrodes correspond such that the belt-shaped conductive layers 52R, 52G, 52B are positioned on the probe contact regions 40R, 40G, 40B. Voltage is then sequentially applied to the belt-shaped conductive layers 52R, 52G, 52B of the inspection probe 50 that was allowed to contact the regions. At this point, when voltage is applied to the scanning (gate) electrodes (not shown) in the same manner, selected scanning (gate) electrodes in a display region are turned on in any color of R, G and B corresponding to signal (source) electrodes to which voltage has been applied, and the color on the line of the signal (source) electrode is not displayed if breaking or the like occurs in the signal (source) electrode.

By performing the inspection in this manner, a broken portion can be easily found because pixels of different colors, which are positioned in close proximity, are not turned on simultaneously, and by applying voltage to any one of the belt-shaped conductive layers 52R, 52G, 52B, areas crossing the scanning (gate) electrodes to which the voltage is similarly applied are displayed in the same color, so that the inspection can be easily performed. Furthermore, when the scanning (gate) electrodes to which voltage is applied are sequentially changed, presence or the like of a break in the scanning (gate) electrode can be detected as well as any interruption or the like in the signal (source) electrode.

As described above, in the liquid crystal display panel according to Example 1 of the present invention, it is possible to accurately perform the intermediate functional inspection of the liquid crystal display panel by installing the conductive probe only once to apply voltage to each belt-shaped conductive layer even if the panel has a quite large number of extraction electrodes.

Further, in the above-described example, the extraction electrodes are lead out on the facing long sides (a), (b) of the chip mounting area MA, but the invention is not limited to this, and they may be lead out on the three sides close to the display surface of the liquid crystal display panel 10 out of the sides of the chip mounting area MA, for example. Consequently, description will be made below of a liquid crystal display panel 10A where the extraction electrodes are lead out on one long side (a) and the facing short sides (c), (d) as Example 2. Note that the same reference numerals are added to the same construction as the liquid crystal display panel 10 of Example 1 and their explanation will be omitted, and only different construction areas will be described in the following.

Figure 6:
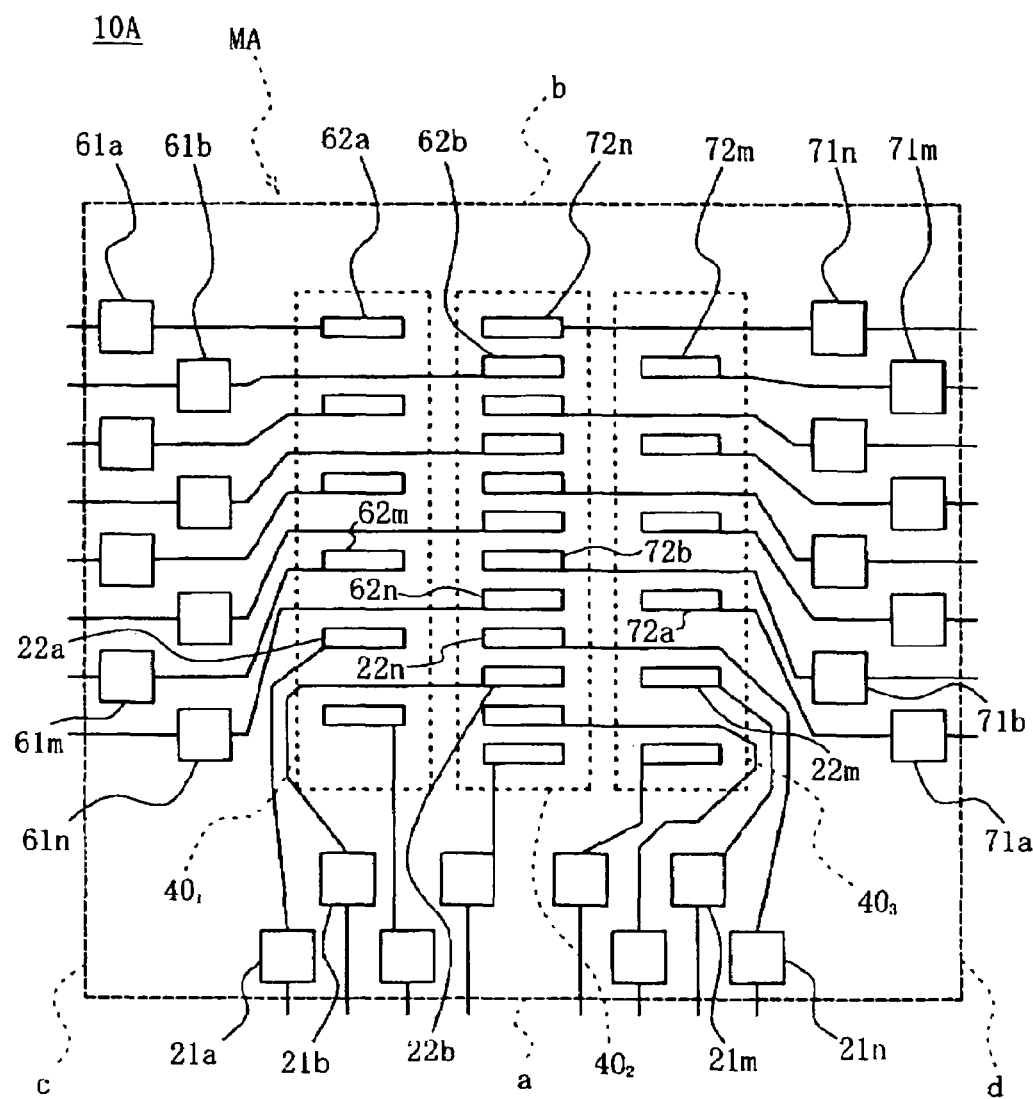
FIG. 6 is a plan view showing the enlarged chip mounting area of the liquid crystal display panel in accordance with Example 2 of the present invention.
Figure 7:
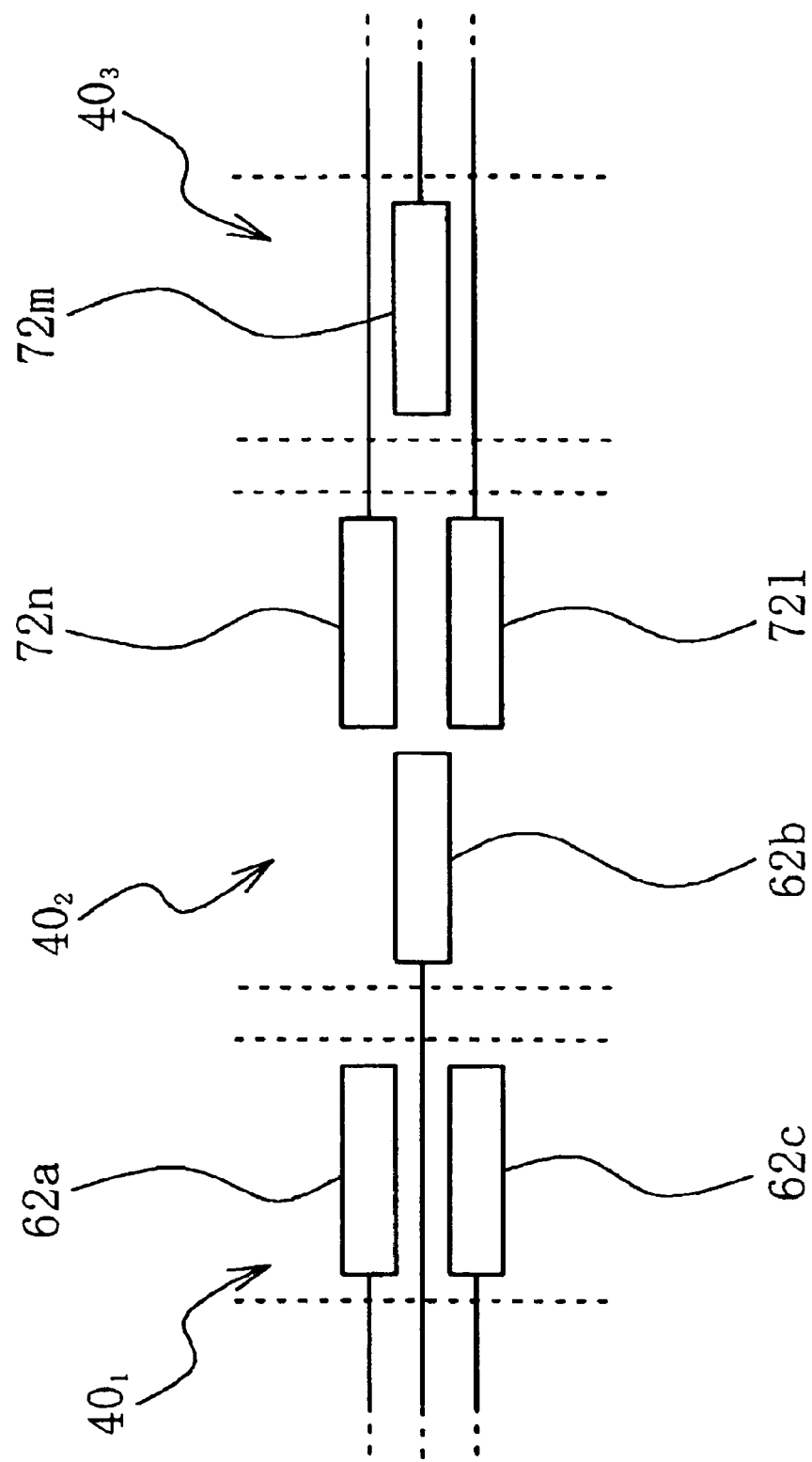
FIG. 7 is a principal portion enlarged view showing a modified example of the arrangement of terminals for inspection.
Figure 8:
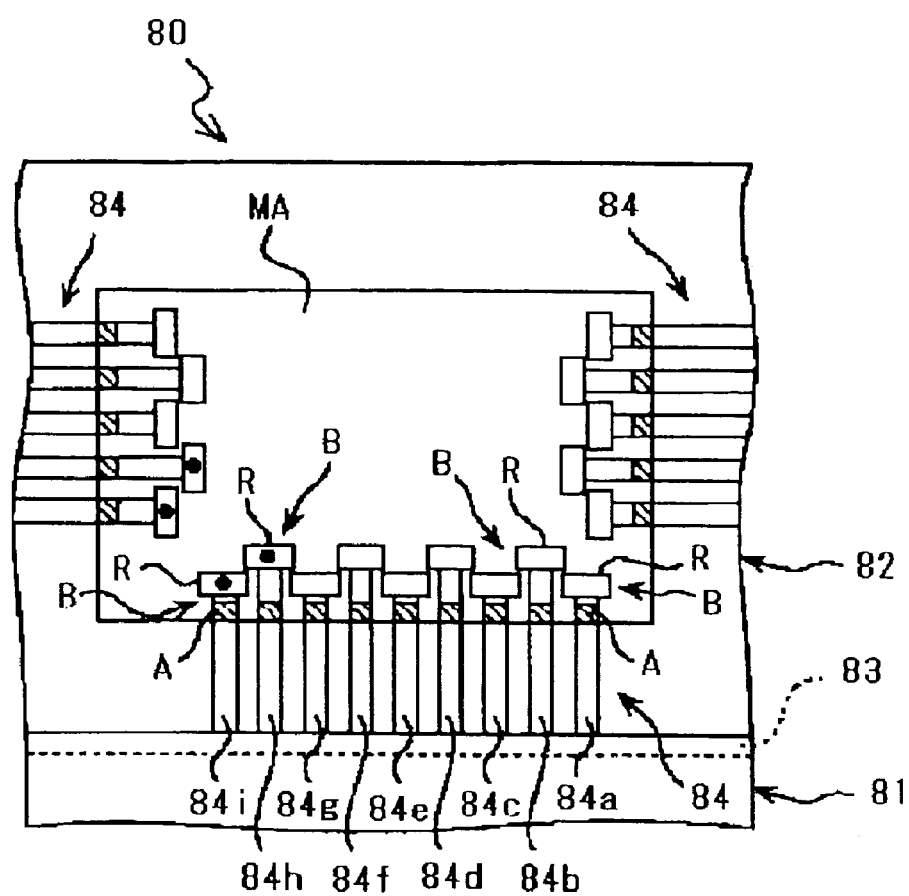
FIG. 8 is an enlarged plan view of a principal portion of the liquid crystal display panel of prior art.
Figure 9:
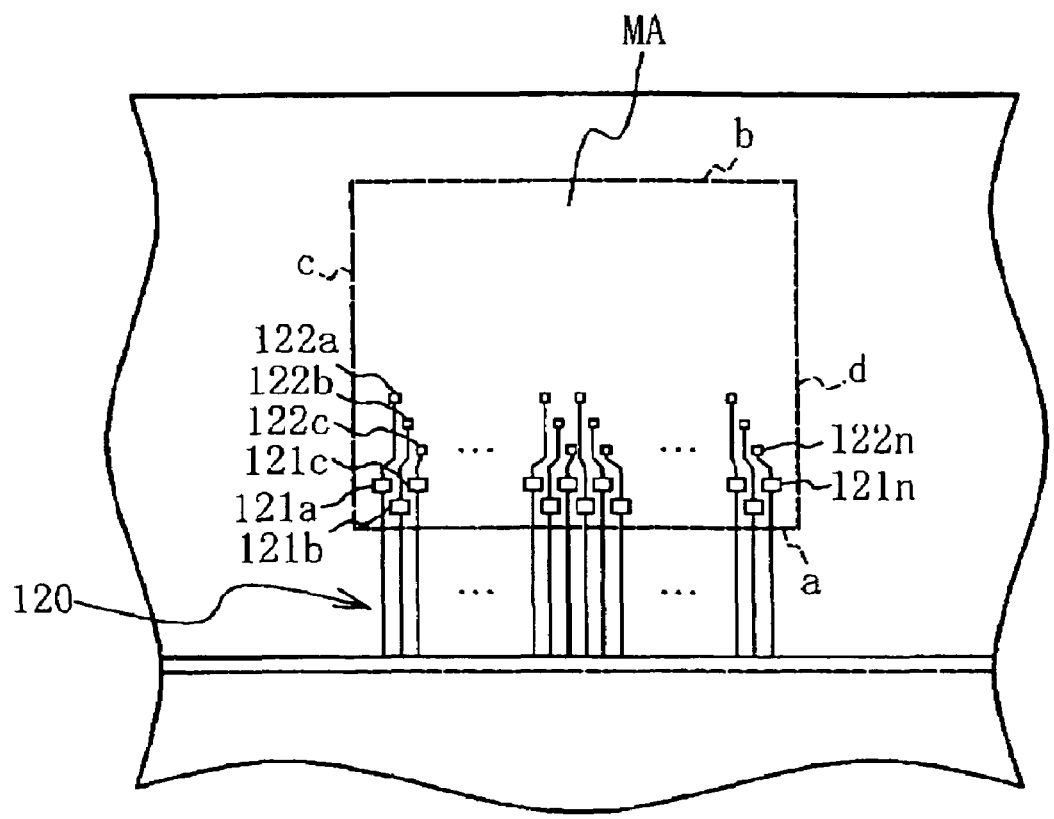
FIG. 9 is an enlarged plan view showing the chip mounting area and its surroundings of a conventional liquid crystal display panel.

FIG. 6 is the plan view showing the enlarged chip mounting area of the liquid crystal display panel according to Example 2 of the present invention, and FIG. 7 is the principal portion enlarged view showing a modified example of the arrangement of terminals for inspection. Note that FIG. 6 shows only eight of the extraction electrodes 20a to 20n, 60a to 60n, 70a to 70n lead out of the chip mounting area MA severally for each side, but the number of electrodes is not limited to this. In addition, the terminals for inspection of the liquid crystal display panel of FIG. 6 are not arrayed corresponding to R, G and B as in Example 1, but the array of the terminals for bump is divided into an even number column and an odd number column and they are arranged so as to be inspected. However, the arrangement is not limited to this array, and it is obvious that the terminals for inspection, which are connected to the transparent electrodes corresponding to the R, G and B pixels as shown in Example 1, for example, can be arrayed separately by pixels corresponding to the transparent electrodes.

In the liquid crystal display panel 10A of Example 2, the extraction electrodes 20a to 20n, 60a to 60n, 70a to 70n are lead out on one long side (a) and the facing short sides (c), (d) of the chip mounting area MA, and terminals for bump 21a to 21n, 61a to 61n, 71a to 71n are formed by drawing them around by a predetermined length and positioning them in the chip mounting area MA, as shown in FIG. 6. The terminals for bump 21a to 21n, 61a to 61n, 71a to 71n are arranged such that their distance from each side of the chip mounting area MA on which extraction electrodes 20a to 20n, 60a to 60n, 70a to 70n, to which the terminals for bump are connected, are lead out is different from that of the adjacent terminals for bump 21a to 21n, 61a to 61n, 71a to 71n. However, the distance from the long side (a) of the adjacent terminals for bump may be the same only for the central area of the long side (a) depending on the number of the terminals for bump.

In the terminals for bump 21a to 21n, 61a to 61n, 71a to 71n, the terminals for bump 21a, 61a, 71a, which are positioned on the far left of each side in close proximity, are arranged closer to each side of the chip mounting area MA at closer proximity than the adjacent terminals for bump 21b, 61b, 71b, the odd numbered terminals for bump counted from the far left are arranged in positions parallel to the terminals for bump 61a, 21a, 71a, and the even numbered terminals for bump counted from the far left are arranged in positions parallel with the terminals for bump 61b, 21b, 71b. Then, the extraction electrodes are further lead out of the terminals for bump 21a to 21n, 61a to 61n, 71a to 71n arranged in this manner, and terminals for inspection 22a to 22n, 62a to 62n, 72a to 72n are positioned on their extremities.

In the following, description will be made of the positions of the terminals for inspection. The terminals for inspection 22a to 22n, 62a to 62n, 72a to 72n are positioned in probe contact regions $40_1$, $40_2$, $40_3$, and the probe contact regions $40_1$, $40_2$, $40_3$ are positioned near the central area of the chip mounting area MA so as to be parallel with the facing short sides (c), (d) of the chip mounting area MA. Of the terminals for inspection 22a to 22n, 62a to 62n, 72a to 72n, the odd numbered terminals for inspection 22a ... 22m, 62a ... 62m, 72a ... 72m from the far left are positioned in the probe contact regions $40_1$, $40_3$, and the even numbered terminals for inspection 22b ... 22n, 62b ... 62n, 72b ... 72n are positioned in the probe contact region $40_2$. Meanwhile, of the odd numbered terminals for inspection 22a ... 22m, 62a ... 62m, 72a ... 72m, the terminals for inspection out of 62a ... 62m and 22a ... 22m, which are connected to the terminals for bump positioned on the left half, are positioned on the probe contact region $40_1$, and the terminals for inspection out of 72a ... 72m and 22a ... 22m, which are connected to the terminals for bump positioned on the right half, are positioned on the probe contact region $40_3$. By positioning the terminals for inspection 22a ... 22n, 62a ... 62n, 72a ... 72n in this manner, inspection using the belt-shaped inspection probe 50 as shown in FIG. 5 can be performed.

Meanwhile, when the above-described positioning is used for the terminals for inspection approximately twice the odd numbered terminals for inspection positioned in the probe contact regions $40_1$, $40_3$ are positioned in the probe contact region $40_2$ on which the even numbered terminals for inspection are placed. In this case, since there is a danger that the terminals for inspection will contact each other, the length of the probe contact region $40_2$ in the width direction may be broadened approximately twice and the terminals for inspection may be disposed in the longitudinal direction of the probe contact region $40_2$ in plural numbers. Although the probe contact region $40_2$ becomes wider than other regions, the same effect as described above will be exerted when the shape of the inspection probe 50 is changed accordingly.

Consequently, in accordance with the liquid crystal display panel of Example 2 for the present invention, the example is also applicable for liquid crystal display panels with a larger number of extraction electrodes because the extraction electrodes are lead out on three sides of the chip mounting area MA, and the length of extraction electrodes can be shortened because the extraction electrodes are not drawn around on a side of the chip mounting area, which is in close proximity to the peripheral edge of the substrate, in addition to the effect of Example 1

The present invention, by including the above-described construction, exhibits the following excellent effects shown below. Specifically, according to the invention of claim 1, the terminals for inspection are arrayed in different columns according to the predetermined rule of electrodes to which the connected extraction electrodes are connected, so that a break, a short circuit or the like of electrodes can be detected by an inspection device using a simple belt-shaped terminal for inspection such as the conductive rubber (hereinafter, referred to as "inspection probe"). Thus, the intermediate functional inspection can be performed using the inspection device, which has a more simple structure and is more inexpensive comparing to the case when using a pin-type probe.

In addition, even in the case where the extraction electrodes are lead out on at least two sides of the approximately rectangular chip mounting area, the terminals for inspection are arrayed according to the predetermined rule for the electrodes to which the extraction electrodes are connected, so that the inspection by the inspection probe can be performed once and the connection of the inspection probe can be done accurately and easily.

Further, since the terminals for bump and the terminals for inspection are separated and the terminals for inspection are used but terminals for bump are not used in performing the intermediate functional inspection, the terminals for bump are not damaged during the inspection and the terminals for inspection are formed inside the chip mounting area, so that the area outside the chip mounting area can be used for other wirings and space can be used effectively. Furthermore, because the extraction electrodes and the terminals for inspection are concealed under the IC chip when the IC chip for driving is mounted on the chip mounting area, corrosion of terminals for inspection, short circuit accidents caused by intrusion of dust, or the like can be prevented and no adverse effect is had on the electrodes, the extraction electrodes or the like after the inspection ends.

Further, according to the invention of claim 2, since the terminals for inspecting R, G and B are arrayed in a separated line by the terminals for inspecting R, G and B sequentially, in addition to the effect of claim 1 inspection for each transparent electrode corresponding to R, G and B pixels can be performed. Moreover, inspection using inexpensive conductive rubber that does not require a pin-type probe can be done with such an array and pixels can be turned on for each single color of R, G and B, so that a break or short circuit of electrode, unevenness of displayed color or the like can be easily found. In addition, due to no pin probe being used, there is no need to broaden the terminals for bump as is conventionally done, and thus the terminals for bump can be arrayed more densely.

Further, according to the invention of claim 3, by leading out the plurality of extraction electrodes on the facing long sides of the chip mounting area, more extraction electrodes can be concentrated on the chip mounting area and wiring between the terminals for bump and the terminals for inspection can be done more easily.

Further, according to the invention of claim 4, by leading out the plurality of extraction electrodes on the three sides of the chip mounting area, which are near the display surface of the liquid crystal display panel, more extraction electrodes can be concentrated on the chip mounting area, and the distance by which the extraction electrodes are drawn around can be shortened and the wiring of extraction electrodes can be easily done because the extraction electrodes are not positioned on the most remote side from the display surface of the liquid crystal display panel.

Further, according to the invention of claim 5, since the terminals for bump and the terminals for inspection are wired not to overlap each other, the wiring can be performed without providing a special stacking structure, and the panel can be manufactured inexpensively.

Furthermore, according to the invention of claim 6, since the width of the terminals for inspection is made narrower than the width of the terminals for bump, a large number of terminals for inspection can be arrayed densely in the chip mounting area.

Still further, according to the invention of claim 7, since the odd numbered terminals for bump and the even numbered terminals for bump are arranged on separate straight lines, a larger number of terminals for bump can be arrayed on one side of the chip mounting area.

What is claimed is:

1. A COG (Chip On Glass) type liquid crystal display panel in which a substantially rectangular chip mounting area for mounting an IC chip for driving liquid crystal is provided on one of a pair of substrates on which a plurality of electrodes are arranged in a matrix state, wherein the electrodes are connected to pixels (R, B, G) of different types, liquid crystal is filled between the substrates whose peripheral areas are bonded together by a sealing material, a plurality of extraction electrodes, which are respectively connected to the electrodes, are lead out of said chip mounting area, and terminals for bump, which are connected to bump terminals of said IC chip for driving liquid crystal, are formed on the extraction electrodes, wherein said plurality of extraction electrodes are lead out at least to two sides of said rectangular chip mounting area and are further extended onto said chip mounting area from said terminals for bump, and terminals for inspection are arrayed on extended end portions of the extraction electrodes such that said terminals for inspection are arrayed in a straight line comprising terminals connected to pixels of the same type, to which extraction electrodes lead out from said at least two sides of the rectangular chip mounting area are connected, wherein said extraction electrodes are connected to transparent electrodes respectively corresponding to pixels of R, G and B, via switching elements, said terminal for inspection are used as terminals for inspecting R, G and B corresponding to said respectively connected transparent electrodes for R, G and B, and the terminals for inspection are arrayed in straight lines consisting of terminals for inspecting R, G and B, respectively.

2. The liquid crystal display panel according to claim 1, wherein said plurality of extraction electrodes are lead out of facing long sides of said rectangular chip mounting area.

3. The liquid crystal display panel according to claim 1, wherein said plurality of extraction electrodes are lead out of three sides of the sides of the rectangular chip mounting area but not from the side that is most remote from the display surface of said liquid crystal display panel.

4. The liquid crystal display panel according to claim 1, wherein extraction electrodes connecting said terminals for bump and the terminals for inspection are wired so as not to overlap each other.

5. The liquid crystal display panel according to claim 1, wherein the width of said terminals for inspection is made smaller than said terminals for bump.

6. The liquid crystal display panel according to claim 1, wherein said terminals for bump are arrayed along the longitudinal direction of sides of said rectangular chip mounting area, and adjacent terminals for bump are arrayed on separate straight lines to prevent the adjacent terminals for bump from contacting each other.

* * * * *